March 28, 1967  F. SCHENK  3,311,802
WARD-LEONARD PLURAL MOTOR ELECTRICAL DRIVE MEANS
Filed Feb. 14, 1964
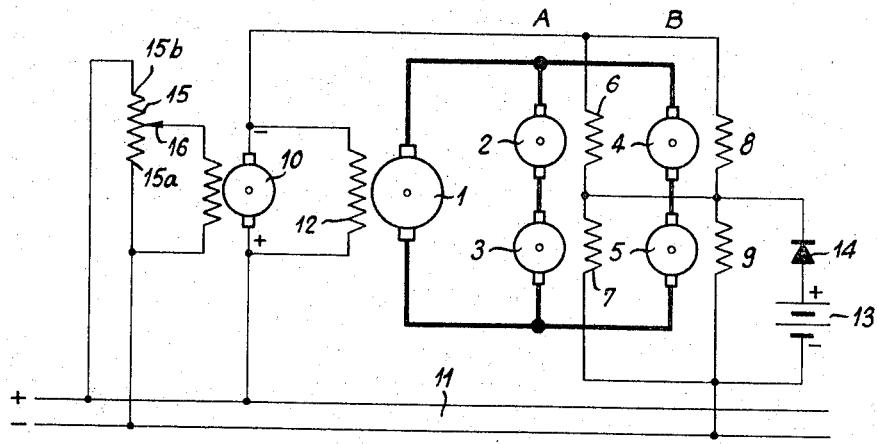
FIG. 1
FIG. 2
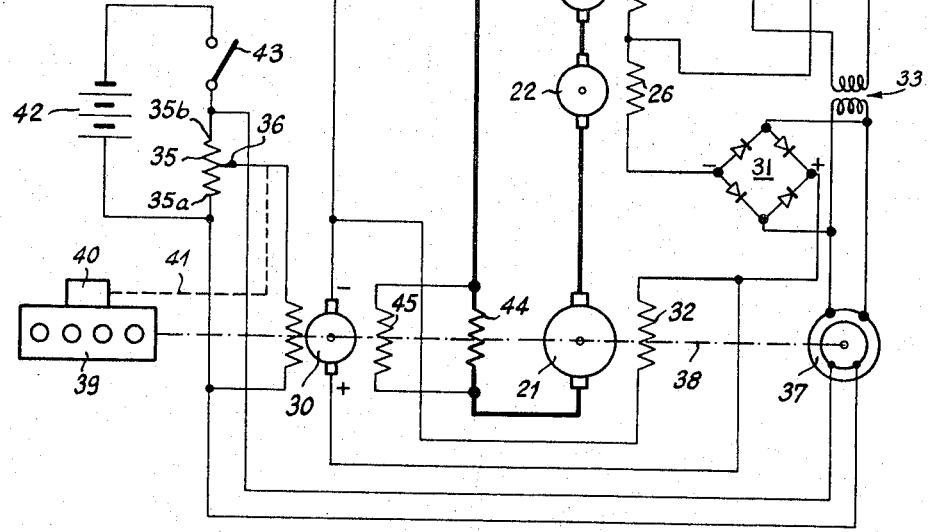

United States Patent Office 3,311,802
Patented Mar. 28, 1967

3,311,802
WARD-LEONARD PLURAL MOTOR ELECTRICAL DRIVE MEANS
Ferdinand Schenk, Satigny, Geneva, Switzerland, assignor to Automobiles M. Berliet, Lyon, France, a French body corporate
Filed Feb. 14, 1964, Ser. No. 344,880
Claims priority, application Switzerland, Feb. 15, 1963, 1,952/63
1 Claim. (Cl. 318—61)

This invention relates to Ward-Leonard type, power transfer, electrical drive means.

An object of the present invention is to provide Ward-Leonard type drive means, comprising a plurality of mechanically coupled motors, that enable both speed variations within a broad range and a progressive transfer of the full power to one or some of the motors, through control of only a single voltage source.

The invention accordingly provides Ward-Leonard type, power transfer, electrical drive means comprising: a plurality of identical, separately-excited, mechanically coupled, direct current motors having their armature windings electrically connected in series to form a first group and having their field windings electrically connected in series to form a second group; a substantially constant voltage, direct current source; a variable voltage, direct current source electrically connected in opposition to said constant voltage source and having control means for selectively and progressively increasing the value of said variable voltage to that of said constant voltage to cancel out said constant voltage source, said constant voltage and variable voltage sources being electrically connected to said second group; a direct current, separately-excited generator having its field winding electrically connected to said variable voltage source in parallel with said second group and having its armature winding electrically connected to said first group; and a unidirectional, direct current source electrically connected across one or some of the field windings of said second group to supply said one or some of the field windings with a current having the same flow direction as that of said constant voltage source.

For a better understanding of the invention and to show how the same may be carried into effect, reference will now be made to the accompanying drawings in which:

FIGURE 1 is a diagram of a first form of embodiment of electrical drive means according to the invention; and FIGURE 2 is a diagram of a second form of embodiment of electrical drive means according to the invention.

The electrical drive means illustrated in FIGURE 1 comprises four identical, separately-excited, mechanically coupled, direct current motors 2, 3, 4 and 5 equally divided into two groups A and B. Motors 2 and 3, which form group A, have their armature windings mounted in series; similarly, motors 4 and 5, which form group B, also have their armature windings mounted in series. These two pairs of armature windings are connected in parallel to the terminals of a generator 1. The field windings are similarly mounted: field windings 6 and 7 of group A and field windings 8 and 9 of group B are in both instances mounted in series, these two pairs of field windings being connected in parallel to two direct current sources, the first consisting of an exciting dynamo 10, and the second consisting of direct current mains 11. The exciting dynamo 10 is mounted in opposition to mains 11. The field winding 12 of generator 1 is connected to the terminals of exciting dynamo 10. A source of unidirectional direct current, constituted by a battery 13 and a valve 14 mounted in series, is connected in parallel to the field windings 7 and 9 of motors 3 and 5 which are intended to receive the full power supply. A potentiometer 15, having a slider 16, serves to regulate the voltage of exciting dynamo 10. This exciting dynamo 10 and generator 1 are driven by any suitable means, not shown.

The drive means operate as follows:

When slider 16 contacts the end 15a of potentiometer 15, the exciting dynamo 10 is not energized and thus does not supply any current. Consequently, generator 1 is not energized either. The field windings 6 to 9 of motors 2 to 5, however, are fully energized by the current from mains 11. The latter supplies field windings 6 to 9 via the armature winding of dynamo 10, which practically does not oppose any back voltage, the voltage drop in its armature winding being negligible. Accordingly, it is practically the full voltage of mains 11 that is applied to field windings 6 to 9. The voltage drop across field windings 7 and 9 is greater than the voltage of battery 13, and valve 14 prevents the flow of a countercurrent towards the battery. When slider 16 is moved towards the end 15b of potentiometer 15, a flux appears in the field winding of exciting dynamo 10 and a voltage is setup thereacross. Generator 1 is thus energized and hence supplies a current to the armature windings of motors 2 to 5. The exciting current in field windings 6 to 9 of motors 2 to 5 gradually decreases as the voltage of exciting dynamo 10 increases since the voltage across their field windings 6 to 9 is equal to the difference between that of mains 11 and that of exciting dynamo 10. An increase in exciting current from dynamo 10 thus simultaneously brings about an increase in supply voltage of motor armature windings of the motors and a progressive deenergization of the latter.

Conversely, when the exciting current of dynamo 10 decreases, the supply voltage of the motor armature windings of the motors decreases, while the voltage across the motor field windings increases.

When the voltage of exciting dynamo 10 increases, the energizing current in the motor field windings decreases. When the voltage across field windings 7 and 9 becomes equal to that of battery 13, the latter maintains the current through field windings 7 and 9 constant whereas the current flowing through field windings 6 and 8 continues to decrease. The supply voltage of the motors progressively shifts to motors 3 and 5, which, when motors 2 and 4 are fully deenergized, thus absorb the entire power output of generator 1. During this power transfer, generator 1 is saturated and its voltage practically does not vary. The described arrangement thus makes it possible to vary the speed of the motors within a wide range by merely acting on the exciting voltage of dynamo 10 through actuation of slider 16.

The voltage of exciting dynamo 10 must not exceed a value equal to the sum of the voltages of mains 11 and battery 13. As regards the voltage of the latter, it must be selected according to the deenergization rate at which the power transfer is to be begun.

It will be readily apparent that the illustrated drive means can include only one group such as A or B or more than two such groups and that each group can include more than two motors.

The drive means illustrated in FIGURE 2 is intended to be mounted in an automotive vehicle, for example a heavy commercial vehicle, propelled by a diesel engine. A direct current generator 21 feeds four identical, separately-excited, mechanically coupled, direct current motors 22, 23, 24 and 25, all mounted in series in a single group. The field windings 26, 27, 28 and 29 of these motors are series mounted and are connected to the terminals of the group formed by a direct current exciting dynamo 30 and an oppositely mounted rectifier 31. The rectifier 31 is supplied by an alternator 37. The latter is mounted on a shaft 38 that is common to the generator 21 and the exciting dynamo 30 and that is driven by a diesel engine 39. The regulator 40 of the latter acts on the slider 36 of a potentiometer 35 through the intermediary of any suitable mechanical linkage 41. This potentiometer 35 and the field winding of alternator 37 are supplied via a contactor 43 by a battery 42. A shunt 44 feeds an anti-compound winding 45 of exciting dynamo 30. A rectifier 34, supplied by alternator 37 via a step-down transformer 33, is connected to the terminals of field windings 27 and 28 of the motors destined to receive the full power.

These drive means operate as follows:

The first and second current sources constituted by exciting dynamo 30 and rectifier 31, respectively, are mounted in series and in opposition to one another; the first source supplies the field winding 32 of generator 21. The motor field windings 26 to 29, which are mounted in series, are connected to the terminals of the group formed by these two current sources. The third current source, which is direct and unidirectional and consisting of the transformer 33 together with the rectifier 34, is connected to the terminals of the field windings 27 and 28 of motors 23 and 24. When the vehicle is at a stop, contactor 43 is open so that exciting dynamo 30, generator 21 and alternator 37 are no longer energized. Accordingly, they no longer supply current. When starting, with diesel engine 39 driving exciting dynamo 30, generator 21 and alternator 37, the closure of contactor 43 brings about the full energization of alternator 37, which alone supplies the field windings 26 to 29 of motors 22 to 25. The linkage 41 is such that the slider 36 of potentiometer 35 contacts the end 35a of the latter when regulator 40 is in the position corresponding to the idle operation of the diesel engine 39. The field winding of exciting dynamo 30 is thus not fed, so that the voltage of the latter is nil; the same therefore applies to generator 21, so that the armature windings of the motors are not supplied. The rectifier 34 is blocked for the voltage it supplies, under the action of the step-down transformer 33, is less than the voltage across the field windings 27 and 28 of motors 23 and 24 produced by the exciting current. When the power of diesel engine 39 is increased, the regulator 40 shifts the slider 36 of potentiometer 35 through the intermediary of linkage 41. Accordingly, the exciting dynamo 30 is progressively energized and its voltage increases. The voltage of generator 21 increases simultaneously and produces an increasing current in the armature windings of motors 22 to 25 which start moving. As the regulator 40 gradually moves slider 36 towards the end 35b of potentiometer 35, the voltage of exciting dynamo 30 increases, whereas that of alternator 37 remains constant, so that the applied voltage across field windings 26 to 29 decreases, since it is equal to the difference between the voltage of rectifier 31 and the voltage of exciting dynamo 30. Motors 22 to 25 hence become progressively deenergized. When the voltage across field windings 27 and 28 becomes equal to that of rectifier 34, the deenergization of motors 23 and 24 ceases, whereas that of motors 22 and 25 continues. The full power is progressively transferred to motors 23 and 24 the field windings of which are supplied by rectifier 34 which maintains their exciting current constant. Suitable dimensioning of the machines makes it possible to achieve complete deenergization of motors 22 and 25 and a full power transfer to motors 23 and 24 when slider 36 reaches the end 35b of potentiometer 35 for a position of regulator 40 corresponding to the maximum speed of the vehicle and to the maximum power of the diesel engine.

This arrangement is particularly simple; moreover, it does not require very accurate designing of the exciting dynamo 30. In this connection, if the voltage of the latter were to exceed the sum of the voltages of the second and third sources constituted by rectifiers 31 and 34, rectifier 31 would prevent a reverse current from flowing. Moreover, this rectifier would prevent any overvoltage appearing at the terminals of exciting dynamo 30 from causing a reverse current.

Resistance 44 and anti-compound winding 45 of the exciting dynamo bring about lineariaztion of the system under running conditions and limit the armature current of the motors at slow speeds.

The exciting dynamo 30 can clearly be replaced by any other means capable of supplying a variable voltage, for example a controlled static converter in anti-parallel mounting.

I claim:

Ward-Leonard type, progressive power transfer, electrical drive means comprising a plurality of identical, separately-excited, D.C. motors arranged in at least one group comprising at least two mechanically coupled motors having their armature and field windings respectively connected in series in each group, a separately excited, D.C. generator having its armature winding connected in parallel with the series-connected armature windings of each group, a first D.C. source adapted to supply the field current of said D.C. generator and connected in parallel with the series-connected field windings of each group, a second D.C. source connected in parallel with said series-connected field windings of each group and in opposition to said first source, control means for progressively varying the voltage of said second source up to the voltage of said first source to cancel out said first source, a third source of unidirectional direct current adapted to supply the field windings of at least one motor of each group, which is destined to receive the full power supply destined for this group, with a current having the same flow direction as that of said first D.C. source, whereby power is progessively transferred between said motors intended to receive the full power supply and the other motors of the respective groups by a progressive increase or decrease of the voltage of said second D.C. source, the full power supply being received by the motors intended therefor when the latter receive their excitation current only from said third direct current source, the excitation currents delivered to all the motors by said first D.C. source then being zero.

No references cited.

ORIS L. RADER, *Primary Examiner.*

T. LYNCH, *Assistant Examiner.*